Feb. 12, 1935.  C. J. WERNER  1,991,038
SYSTEM OF MOTOR CONTROL
Filed March 22, 1933   2 Sheets-Sheet 1

INVENTOR
Calvin J. Werner
BY
his ATTORNEYS

Feb. 12, 1935.   C. J. WERNER   1,991,038
SYSTEM OF MOTOR CONTROL
Filed March 22, 1933    2 Sheets-Sheet 2
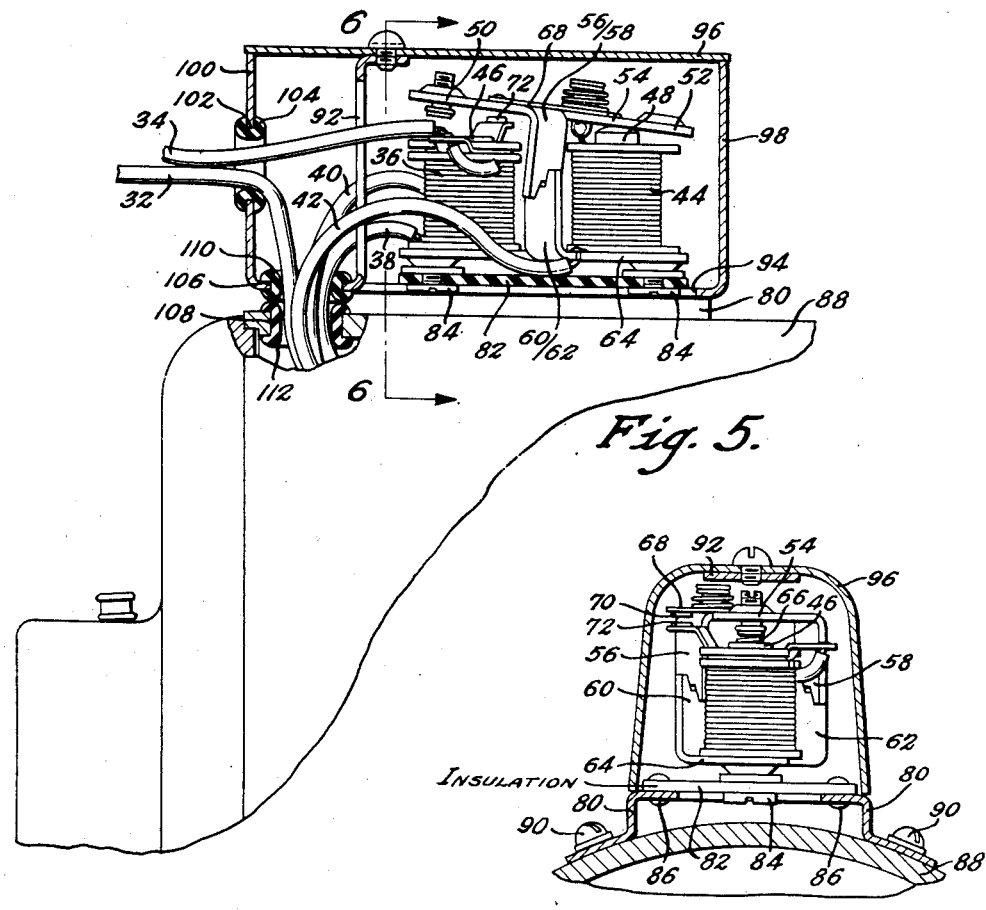
Fig. 5.
Fig. 6.
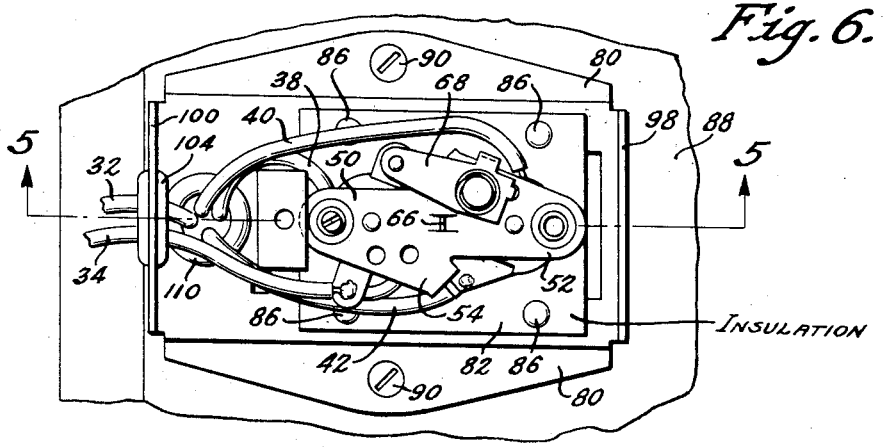
Fig. 7.
INVENTOR
Calvin J. Werner
BY
his ATTORNEYS Patented Feb. 12, 1935

1,991,038

UNITED STATES PATENT OFFICE 1,991,038

SYSTEM OF MOTOR CONTROL

Calvin J. Werner, Dayton, Ohio, assignor, by mesne assignments, to General Motors Corporation, Detroit, Mich., a corporation of Delaware Application March 22, 1933, Serial No. 662,027

14 Claims. (Cl. 172—279)

This invention relates to alternating current motors, and particularly to a system of starting and control for single phase alternating current motors.

An object of this invention is to provide a reliable and durable control system for single phase alternating current motors.

Another object of the present invention is to provide an electrically operated control system for controlling the starting and running circuits of single phase alternating current motors.

Another object of this invention is to provide a control system for single phase alternating current motors that will compensate, within a reasonable range, for variations in line voltage encountered in use, and operate consistently.

Another object of this invention is to provide an electrically controlled system for controlling the circuits to the windings of a split phase alternating current motor.

Further objects and advantages of the present invention will be apparent from the following description, reference being had to the accompanying drawings wherein a preferred embodiment of one form of the present invention is clearly shown.

In the drawings:

Fig. 5 is a fragmentary sectional view of an electric motor equipped with control apparatus and embodying the present invention.

Fig. 6 is a sectional end view of the electromagnetic switch showing a fragmentary sectional view of the motor to which it is mounted.

Fig. 7 is a top view of the electromagnetic switch, and also indicates a fragmentary view of the motor to which the switch is mounted.

Figure 1:
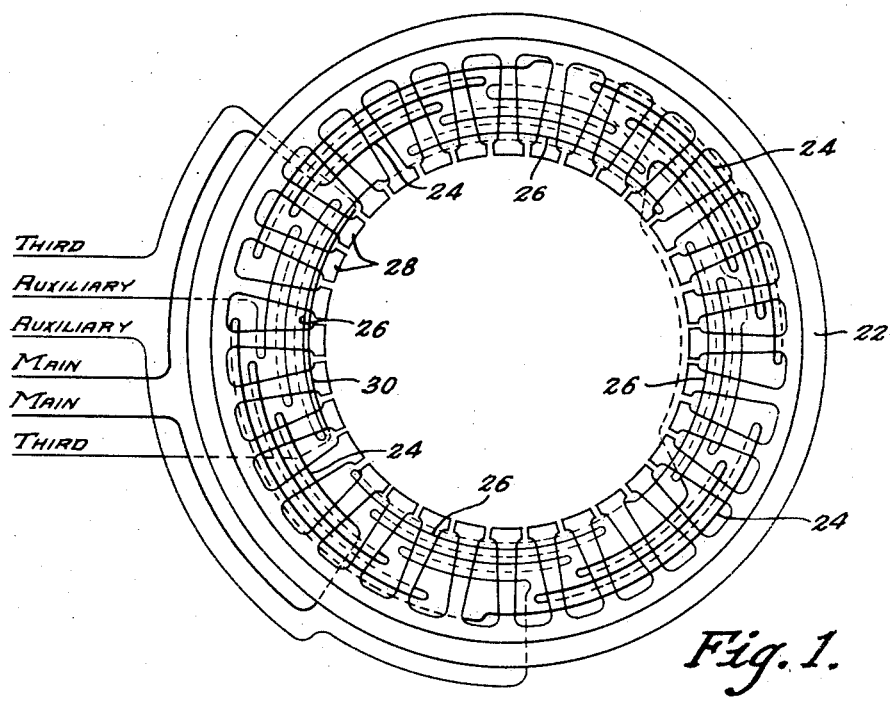
Fig. 1 is a wiring diagram of a stator of a motor adapted to be used in the present invention.
Figure 2:
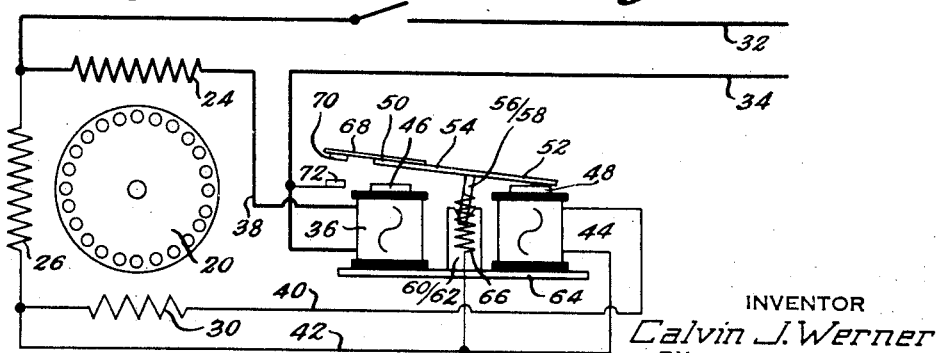
Fig. 2 is a wiring diagram illustrating the circuit connections of a system embodying the present invention.

With particular reference to Figs. 1 and 2, the electric motor comprises a squirrel cage rotor 20 in cooperative relation with a stator 22 which includes a main field winding 24 and an auxiliary field winding 26 arranged as shown in Fig. 1. The stator 22 has teeth such as 28 which are surrounded by the windings. The stator teeth surrounded by one part or section of the auxiliary winding 26 are also surrounded by a third winding 30 which is effectively magnetically coupled with the rotor and only the auxiliary winding 26, since the coupling between the winding 30 and the ends of the main field winding 24 is substantially neutralized by virtue of the substantially equal coupling with both ends of that winding.

A power supply line wire 32 is connected to the main field winding 24 and to the auxiliary field winding 26. Another power supply line wire 34 is connected to an electromagnet coil 36 which in turn is connected by a wire 38 to the main field winding 24. The third winding 30 is connected by wires 40 and 42 to an electromagnet coil 44, and also has one end connected to an end of the auxiliary field winding 26. The connection between one end of the third winding 30 and the end of the auxiliary winding 36 does not influence the operation of the third or auxiliary windings, but saves an extra connecting lead from the motor that would be necessary if the windings were not so connected. Coils 36 and 44 surround cores 46 and 48 respectively, which cooperate with lever arms 50 and 52 of a common armature 54, which armature is provided with two bifurcated arms 56 and 58 which straddle respectively bifurcated arms 60 and 62 of the base 64, as shown in the diagram. The armature 54 is maintained yieldingly either in a position inclined toward the core 48, or inclined toward the core 46, by a spring 66 connecting the armature 54 with the base 64, and so arranged that its center line of action moves to either side of a vertical center line of the bifurcated arms 56, 58, 60 and 62. The armature 54 has a contact carrying member 68 mounted thereon and carrying a contact 70 engageable with a cooperating contact 72. The contact 72 is connected to the power supply line 34, and the contact 70 is connected through a contact carrying member 68, armature 54, and the bifurcated arms 56, 58, 60 and 62 to the wire 42 and the connected ends of the auxiliary field winding 26 and third winding 30. Since the base 64 with its arms 60 and 62, and the armature 54 with its arms 56 and 58, 50 and 52, and the contact carrying member 68 are all of conducting material, the circuit from the power supply line wire 34 may be closed through the cooperating contacts 70 and 72 to the auxiliary field winding 26.

When the power supply line circuit is closed, the electromagnet 36 will be energized by virtue of its connection to both sides of the power supply line; the circuit to one side of the electromagnet 36 being completed through the main field winding 24. At the instant prior to starting, only a small current will be induced in the electromagnet 44, since at that instant prior to starting the rotor is stationary, and since without rotation of the rotor there will be no rotational voltage induced into the third winding 30, although there is a small transformer voltage induced therein after the circuit to the auxiliary field winding 26 is closed. Therefore, regardless of the voltage impressed upon the main field winding 24, within reasonable limits, the electromagnet 36 will attract the armature 54 and thereby bring about engagement of the cooperating contacts 70 and 72. The engagement of these contacts will be facilitated and aided by the spring 66 when it crosses the center line of the bifurcated arms to the side toward which the armature is moved. After the engagement, the pull of the electromagnet 36 upon the armature 54 together with the urging force of the spring 66 tend to maintain engagement of the contacts. Thus, the line wire 34 is connected through the previously mentioned portions of the switch and the wire 42 to the auxiliary winding 26. The circuit thus formed to the main and auxiliary field windings 24 and 26 respectively, together with those windings, causes a rotating field to be produced that starts the rotation of the rotor 20.

Figures 3, 4:
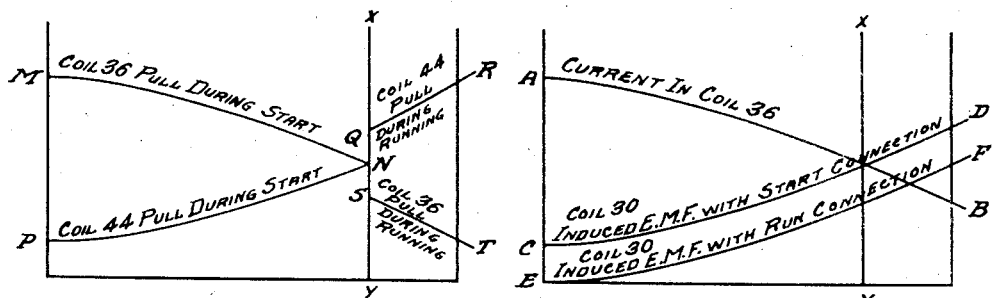
Fig. 3 illustrates by curves the variations in pull of the electromagnets of the electromagnetic switch corresponding to variations in the speed of the rotor.
Fig. 4 illustrates by curves the variations in the induced electromotive forces and current impressed upon the electromagnets of the electromagnetic switch corresponding to variations in the speed of the rotor.

A rotational voltage is induced into the third winding 30 by virtue of its magnetic relation with the rotor field, and the rotation of the rotor. Referring to Fig. 4, it will be noted that as the rotor speed increases the current in the electromagnet 36 decreases, while the induced electromotive force in the winding 30 increases, as represented by the curves A—B and C—D respectively. Consequently, the pull effected by the electromagnet 36 upon the armature 54 decreases, as represented by the curve M—N in Fig. 3; while the pull effected by the electromagnet 44 increases due to the increased voltage induced in the winding 30 due to the increase of rotor speed, and as represented by the curve P—N. At certain critical speeds, such as that represented by lines x—y in Figs. 3 and 4, the forces exerted upon the arms 50 and 52 of the armature 54 will be substantially equal and any increase in speed above that value will result in the armature 54 being moved into a position such as that indicated in Fig. 2, with the armature 54 attracted by the electromagnet 44. Thus, contacts 70 and 72 will be thereby disengaged, and the circuit from the line wire 34 to the auxiliary field winding 26 opened. The rotor, at this point, shall have reached a sufficient speed to produce its own rotating field by virtue of the transformer and rotational voltages induced therein, and the running circuit thereby established.

Referring again to Figs. 3 and 4, it will be noted that while the switch is thus in the run position, and the rotor is rotating at a speed above that indicated by the lines x—y, the voltage induced in the third winding 30 which effects the energization of the electromagnet 44, is less than when the switch is in the start position and the rotor speed is below that indicated by the lines x—y, as represented by the curve E—F. This is due to the opening of the circuit to the auxiliary field winding 26, since the third winding 30 is electromagnetically coupled with that winding, as well as magnetically associated with the rotor 20. However, the electromagnet 44 exerts a greater force upon the arm 52 of the armature 54 than the electromagnet 36 does upon the arm 50, as represented by the curves Q—R and S—T. This is due to the characteristic variation in the force of a magnet with the distance from the magnet. This decrease in the induced E. M. F. in the coil 30, between start and run conditions, since it enables the switch to return more easily to the start position in case of overload.

With reference to Figs. 5, 6 and 7, the electromagnetic switch shown, and illustrated diagrammatically in Fig. 2, is the subject matter of my copending application, Serial No. 642,158, and is there explained in detail. Since the principal elements of the structure and operation of this switch have been previously described herein, and similar reference numerals applied to similar parts in Figs. 5, 6 and 7, no further explanation and details of that switch will be given with reference to the latter figures. The base 64 of the switch is attached to a mounting bracket 80, and is insulated therefrom by an insulating plate 82. The base 64 is secured to the plate 82 by screws such as 84 or any suitable fastening means, and the plate 82 is secured to the mounting bracket 80 by rivets such as 86 or any suitable fastening means. The bracket 80 provides a convenient means for attaching the electromagnetic switch to a housing 88 of the motor, and is secured thereto by screws such as 90 or any suitable fastening means. A strip of material 92 formed from that punched from the bracket 80 to provide an opening 94 over which the insulating plate 82 is secured, provides a means for securing a cover 96 over the switch. Ends 98 and 100 of the bracket 80 are formed to provide the ends of the housing for the switch to form a complete enclosure therefor. The power supply line wires 32 and 34 extend through an opening 102 in the end 100 of the housing, and an insulating grommet 104 is provided in the opening to protect the wires extending therethrough. The wires 38, 40 and 42, as well as the line wire 32 extend through an opening 106 in the bracket 80 and an opening 108 in the motor housing 88 to provide the necessary circuit connection, and insulating grommets 110 and 112 are provided in the openings 106 and 108 respectively for the protection of the wires.

In the disclosed embodiment of the present invention, the windings, including the main and auxiliary field windings and the third winding are considered stator windings because wound thereon. By virtue of the placing or position of the third winding, that winding has greater magnetic coupling with the auxiliary field winding than with the main field winding. In fact, it is effectively magnetically coupled with only the auxiliary field winding. Hence, there is some voltage induced in the third winding when the circuit to the auxiliary winding is closed. However, due to the magnetic relation of the rotor and the third winding, the voltage induced in the third winding increases as the rotor speed increases, since the rate at which the third winding cuts the rotor flux increases with the rotor speed. Then, since the rotation of the rotor produces a counter electromotive force in the main field winding, which counter electromotive force also increases with the rotor speed, the current through the main field winding decreases as the rotor speed increases. Since the electromagnets 36 and 44 are connected to the main and third windings respectively, and in fact, the electromagnet 36 is connected in series with the main field winding 24 while the electromagnet 44 is connected across the third winding 30. And, since the pull of the electromagnets is dependent upon the current therethrough, the pull of the electromagnet 36 decreases as the pull of the electromagnet 44 increases. The electromagnets opposingly coact upon a common armature and the position of that armature is consequently controlled by the current through the main field winding and the potential across the third winding, and thus serves as a convenient means for controlling the starting and running circuits of the motor in starting the motor, or in the operation of the motor when an overload or some such condition occurs to appreciably change the speed of the motor.

Since the main field winding and the electromagnet 36 are connected in series and across the power supply line, the pull of the electromagnet 36 is directly affected by variations in line voltage. And, since the third winding is magnetically coupled with the auxiliary field winding, as well as with the rotor, and since the rotor speed is dependent somewhat upon line voltage, the pull of the electromagnet 44 is dependent upon factors including line voltage and rotor speed. The coaction of the electromagnets, together with the dependence of the pull of the electromagnets upon line voltage, affords a means for compensating, within reasonable limits, for fluctuations or variations in the line voltage.

While the form of embodiment of the present invention as herein disclosed, constitutes a preferred form, it is to be understood that other forms might be adopted, all coming within the scope of the claims which follow.

What is claimed is as follows:

1. A system of motor control for a motor having a rotor and a stator, comprising, in combination, a plurality of stator windings including a plurality of field windings, and a third winding connected to one of the field windings and having greater electromagnetic coupling with one of the windings than with the other, said third winding being magnetically associated with the rotor and having a voltage induced therein by the rotor flux; a starting circuit; a running circuit; and a switch for controlling the starting and running circuits, said switch having one actuating electromagnet connected in series with one of the field windings, and another actuating magnet connected across the third winding.

2. A system of motor control for a motor having a rotor and a stator, comprising, in combination, a plurality of stator windings including a plurality of field windings, and a third winding connected to one of the field windings and effectively magnetically coupled to only one of the field windings, said third winding being magnetically coupled with the rotor and having a voltage induced therein by the rotor flux; a starting circuit; a running circuit; and a switch for controlling the starting and running circuits, said switch having one actuating magnet connected to the main field winding, and another actuating magnet connected to the third winding.

3. A system of motor control for a motor having a rotor and a stator, comprising, in combination, a plurality of stator windings including main and auxiliary field windings, and a third winding connected to one of the field windings and having greater magnetic coupling with the field winding to which it is connected than with the other field winding, said third winding being magnetically linked by the rotor flux; a starting circuit; a running circuit; and a switch for controlling the starting and running circuits, said switch having actuating means controlled by the current through one field winding and the potential across the third winding.

4. A system of motor control for a motor having a rotor and a stator, comprising, in combination, a plurality of stator windings including main and auxiliary field windings, and a third winding connected to one of the field windings and having effective magnetic coupling with only the winding to which it is connected, said third winding being magnetically coupled with the rotor; a starting circuit; a running circuit; and a switch for controlling the starting and running circuits, said switch having actuating means controlled by the current through one field winding and the potential across the third winding.

5. A system of motor control for a motor having a rotor and a stator, comprising, in combination, main and auxiliary field windings; an impedance connected to the auxiliary field winding and magnetically associated with the rotor; a starting circuit; a running circuit; a switch for controlling the starting and running circuits and having actuating means, said means including an electromagnet responsive to the current through one of the windings, and an electromagnet connected across the impedance.

6. A system of motor control for a motor having a rotor and a stator, comprising, in combination, main and auxiliary field windings; an impedance connected to the auxiliary field winding and magnetically associated with the rotor; a starting circuit; a running circuit; a switch for controlling the starting and running circuits and having actuating means, said means including an electromagnet responsive to the current through the main field winding, and an electromagnet connected to the impedance.

7. A system of motor control for a motor having a rotor and a stator, comprising, in combination, main and auxiliary field windings; an impedance connected to the auxiliary field winding and magnetically associated with the rotor; a starting circuit; a running circuit; a switch for controlling the starting and running circuits and having actuating means, said means including an electromagnet connected in series with the main field winding, and an electromagnet connected to the impedance.

8. A system of motor control for a motor adapted to be connected to a power supply line and having a rotor and stator, comprising, in combination, main and auxiliary field windings, and a third winding magnetically coupled with the rotor and one of the field windings; a switch having cooperating contacts, and a pair of electromagnets for controlling the contacts, said contacts being connected intermediate the auxiliary field winding and the power supply line to close the circuit to that winding for starting the motor and which, when open, establish the running circuit of the motor; one of said electromagnets being connected in the circuit of the main field winding to effect the closing of the contacts; the other of said electromagnets being connected to the third winding and effecting opening of the contacts to establish the running circuit.

9. A system of motor control for a motor adapted to be connected to a power supply line and having a rotor and stator, comprising, in combination, main and auxiliary field windings, and a third winding magnetically coupled with the rotor and having less magnetic coupling with the main field winding than with the auxiliary field winding; a switch having cooperating contacts which, when open, establish the running circuit of the motor, and a pair of electromagnets for controlling the contacts; said contacts being connected intermediate the auxiliary field winding and the power supply line to close the circuit to that winding for starting the motor; one of said electromagnets being connected in the circuit of the main field winding to effect the closing of the contacts; and the other of said electromagnets being connected to the third winding and effecting opening of the contacts to establish the running circuit.

10. A system of motor control for a motor adapted to be connected to a power supply line and having a rotor and a stator, comprising, in combination, main and auxiliary field windings, and a third winding effectively magnetically coupled with the rotor and with only the auxiliary field winding; a switch having cooperating contacts which, when open, establish the running circuit of the motor, and a pair of electromagnets for controlling the contacts; said contacts being connected intermediate the auxiliary field winding and the power supply line to close the circuit to that winding in starting the motor; one of said electromagnets being connected in the circuit of the main field winding to effect the closing of the contacts; and the other of said electromagnets being connected to the third winding and effecting opening of the contacts to establish the running circuit.

11. A system of motor control for a motor adapted to be connected to a power supply line and having a rotor and a stator, comprising, in combination, main and auxiliary field windings, and a third winding connected and coupled to one of the field windings and magnetically associated with the rotor; a switch having cooperating contacts and a pair of separate electromagnets for controlling the contacts; said contacts being connected intermediate the auxiliary field winding and the power supply line to close the circuit to that winding in starting the motor; one of said electromagnets being connected in the circuit of the main field winding to effect the closing of the contacts; and the other of said electromagnets being connected to the third winding and effecting opening of the contacts to establish the running circuit.

12. A line voltage compensating system of motor control for a split phase motor having a rotor, a stator, main and auxiliary field windings, and a third winding, comprising, in combination, a switch having a movable element for closing the circuit to the auxiliary field winding during starting, and opening the auxiliary field winding circuit after the rotor has gained speed; an electromagnet acting upon said element for moving it in one direction, said electromagnet being connected in the circuit of the main field winding and directly affected by changes in line voltage; a second electromagnet connected to the third winding and opposingly coacting upon said element for moving said element in another direction to open the circuit to the auxiliary field winding, the force of said second electromagnet being affected in its action by factors including rotor speed and line voltage.

13. A system of motor control for a motor having a rotor and a stator, comprising, in combination, main and auxiliary field windings; an impedance having one end connected to one end of the auxiliary winding, said impedance having a voltage induced therein, the value of which voltage is dependent upon rotor speed; a starting circuit; a running circuit; a switch for controlling the starting and running circuits and having actuating means, said means including an electromagnet connected in series with the main field winding, and an electromagnet connected to the impedance.

14. A system of motor control for a motor including a rotor and a stator having slots therein comprising, in combination, main and auxiliary field windings in said slots, each of said windings being divided into sections to provide magnetic poles; a third winding connected to one of the field windings and substantially concentric with one section of the auxiliary field winding, said third winding being magnetically associated with the rotor; a starting circuit; a running circuit; and a switch having start and run positions for controlling the starting and running circuits; means for moving the switch to the start position; and means responsive to the voltage induced in the third winding for actuating the switch to the run position.

CALVIN J. WERNER.